US011407627B2

(12) United States Patent
Seiser et al.

(10) Patent No.: US 11,407,627 B2
(45) Date of Patent: Aug. 9, 2022

(54) TREATMENT MACHINE FOR CONTAINERS AND/OR BEVERAGES, COMPRISING A VISUALISATION OF OUTPUT

(71) Applicant: KRONES AG, Neutraubling (DE)

(72) Inventors: Matthias Seiser, Soechtenau (DE); Florian Deisenrieder, Bad Feilnbach (DE); Markus Dusch, Fridolfing (DE)

(73) Assignee: KRONES AG, Neutraubling (DE)

( * ) Notice: Subject to any disclaimer, the term of this patent is extended or adjusted under 35 U.S.C. 154(b) by 184 days.

(21) Appl. No.: 16/631,598

(22) PCT Filed: Sep. 10, 2018

(86) PCT No.: PCT/EP2018/074334
§ 371 (c)(1),
(2) Date: Jan. 16, 2020

(87) PCT Pub. No.: WO2019/048684
PCT Pub. Date: Mar. 14, 2019

(65) Prior Publication Data
US 2020/0223679 A1    Jul. 16, 2020

(30) Foreign Application Priority Data
Sep. 8, 2017  (DE) ..................... 10 2017 120 818.6

(51) Int. Cl.
*B67C 3/00* (2006.01)
*G05B 19/042* (2006.01)
*G05B 19/05* (2006.01)

(52) U.S. Cl.
CPC .......... *B67C 3/007* (2013.01); *G05B 19/0423* (2013.01); *G05B 19/0425* (2013.01);
(Continued)

(58) Field of Classification Search
USPC ....................................................... 700/117
See application file for complete search history.

(56) References Cited

U.S. PATENT DOCUMENTS 7,900,422 B2 * 3/2011 Fischer ................. B67C 7/0073
53/426
2009/0138587 A1  5/2009 Callaghan
(Continued)

FOREIGN PATENT DOCUMENTS

CN 101573671 A 11/2009
CN 104698914 A 6/2015
(Continued)

OTHER PUBLICATIONS

International Search Report dated Feb. 20, 2019 for PCT/EP2018/074334.
(Continued)

*Primary Examiner* — Md Azad
(74) *Attorney, Agent, or Firm* — Schmeiser, Olsen & Watts, LLP

(57) ABSTRACT

Provided is a method for controlling at least one of a container treatment machine and a beverage treatment machine, wherein the treatment machine treats at least one of containers and beverages using predeterminable parameters, wherein at least one control device controls the treatment machine at least temporarily taking into account the parameters, and wherein these parameters are input at least temporarily by an input device, and wherein, by an information output device, information is output at least temporarily to a user, the information being characteristic of a status of at least one of the machine and of data input by the user. According to embodiments of the invention, the information is at least partially output in image form.

18 Claims, 1 Drawing Sheet

(52) U.S. Cl.
CPC .. *G05B 19/054* (2013.01); *G05B 2219/13051* (2013.01); *G05B 2219/23121* (2013.01); *G05B 2219/23157* (2013.01); *G05B 2219/2645* (2013.01); *G05B 2219/35324* (2013.01); *G05B 2219/35337* (2013.01)

(56) References Cited

U.S. PATENT DOCUMENTS

| | | | |
|---|---|---|---|
| 2009/0222126 A1* | 9/2009 | Hsu | G06Q 10/087 700/117 |
| 2013/0231772 A1* | 9/2013 | Hahn | B29C 67/00 700/204 |
| 2014/0303754 A1 | 10/2014 | Nixon et al. | |
| 2015/0096267 A1 | 4/2015 | Svensson | |
| 2018/0267513 A1* | 9/2018 | Wetsch | G05B 19/4183 |

FOREIGN PATENT DOCUMENTS

| | | |
|---|---|---|
| CN | 105378571 A | 3/2016 |
| CN | 106715274 A | 5/2017 |
| JP | H07191716 A | 7/1995 |
| JP | 2016051549 A | 4/2016 |

OTHER PUBLICATIONS

Chinese Office Action dated Apr. 13, 2021 for Application No. 2018800484881.

Siemens Industry Online Support. "Getting Started STEP 7 Professional I WinCC Advanced V 11 fur Beispielprojekt Filling Station", No. A5E03728922-01, Oct. 1, 2011 (Oct. 1, 2011), pp. 1-16, 159-242, Handbuch Getting Started.

* cited by examiner

TREATMENT MACHINE FOR CONTAINERS AND/OR BEVERAGES, COMPRISING A VISUALISATION OF OUTPUT

CROSS-REFERENCE TO RELATED APPLICATIONS

This application claims priority to PCT Application No. PCT/EP2018/074334, having a filing date of Sep. 10, 2018, based on German Application No. 10 2017 120 818.6, having a filing date of Sep. 8, 2017, the entire contents both of which are hereby incorporated by reference.

FIELD OF TECHNOLOGY

The following relates to a method for controlling a container treatment machine and/or a beverage treatment machine and also to a container treatment machine and/or a beverage treatment machine. Instead of the terms "container treatment machine" and "beverage treatment machine", only the abbreviated term "treatment machine" is used below.

BACKGROUND

Numerous such machines, such as for instance labelling machines, blow moulding machines, palettizers and the like, are known from conventional art. These machines usually have control devices which control these machines, for example the drives thereof. In this case it is known that parameters and or data which are used for controlling the machine are input by a user. However, only very limited assistance is available to the user for input of the values or parameters. In this case it is also known from the internal conventional art of the applicant that textual instructions to the user are output at the moment of input.

However, such purely textual instructions can result in several disadvantages. Thus, it is possible that these textual inputs are interpreted differently by different users. In particular, it is also possible for less trained staff, that for example they do not understand foreign words which occur, and therefore the machine may be operated faulty. In addition, the textual instructions often do not provide a precise local reference to the real machine or to the machine part on which the respective parameters are input or on which they take effect.

Sometimes such textual instructions are also provided with location details or designations of machine parts, so that in some instances the users do not understand where for instance these values are determined. In this way an incorrect determination of the individual values can occur and ultimately the consequence may be an incorrect setting of the machine.

SUMMARY

An aspect relates to a method according to embodiments of the invention for controlling a container treatment machine and/or a beverage treatment machine, wherein the treatment machine treats containers and/or beverages using predeterminable parameters, and wherein at least one control device controls the treatment machine at least temporarily taking into account the parameters, these parameters are input at least temporarily by means of an input device, and wherein, by means of an information output device, information is output at least temporarily to a user, the information being characteristic of a status of the machine and/or of data input by the user and/or of the effects thereof on the machine.

According to embodiments of the invention, the information is at least partially output in image form.

Thus, whereas in conventional artwork only proceeds with textual instructions to the user, in the context of embodiments of the present invention it is proposed that the instructions to the user are also supported at least by pictorial elements.

The information may be output at least partially in a visually perceptible form. In a further preferred method, the information is selected from a group of information which includes status information about the status of the machine, work instructions, information about working steps to be carried out, actual states of the machine, target states of the machine and the like.

The image elements may be static graphics and/or image elements. However, it would also be possible for the image elements to be video sequences. These may be for instance video sequences which show a work sequence.

This information and/or these image elements may be selected or displayed taking account of the inputs by the user, for example the input parameters. If for example the user changes a parameter which relates to a preliminary blow moulding pressure in a blow moulding machine, the information output device can indicate the region of the blow moulding machine in which this parameter is relevant. By the input of a parameter and/or by the selection of a parameter to be input, also the selection of at least one graphic in particular from a plurality of graphics stored in a storage device takes place, wherein this graphic in particular shows a predetermined machine part of the machine.

The selection of the graphic takes place automatically. Besides or additionally it is also conceivable that a graphic is retrieved by the user.

In order to remedy the disadvantages listed above and therefore to ensure a fault-free setting of values on the machine, embodiments of the invention in particular proposes an improved visualization. With this invention, for at least one value and for several values and particularly for every value which is being set at the moment, there are several aids for setting this value.

Thus, in contrast to the conventional art, not or not only linguistic instructions or instructions in text form are output to the user but there are image elements which at least support this output. An "image form" and/or "image elements" are understood in particular to be graphic elements, which cannot be generated directly with the keys of a computer keyboard, that is to say in particular graphic elements which surpass signs, numbers and letters, such as can be generated directly by means of a computer keyboard. These may be in particular images and/or video sequences of machine parts. In this case these images and or video sequences have yet further elements added to them, such as for instance arrows, which point to a specific machine element or indicate a direction of movement to the user.

In a preferred method, the image form and/or the image element contains at least one and optionally several graphic elements. The image form may contain a graphic of the machine and/or of the machine part on which the relevant parameters take effect. In particular the machine, or a machine part as it appears in the machine, is displayed. In this way even the less experienced user is quickly able to find this machine part.

It is also possible that the information output device at least temporarily outputs an enlarged image of the machine or of a machine part. In this case it is also possible that for better illustration at least temporarily a machine part and also an enlarged detail of this machine part is simultaneously displayed, in order to simplify orientation for the user. Such an enlarged display may be triggered by a user input, in particular but not exclusively by the selection of a specific parameter by the user. Thus, it is possible for example to zoom into the graphic by clicking on a specific parameter. The graphic or the display thereof may be positioned on the region in which the value to be set is to be determined and/or for which the value to be set takes effect.

In addition, it is also possible that specific regions of the graphic are in particular optically highlighted, for example by changing a colour of these regions. This can take place in particular by colouring of components which are important in the determination of the value to be set. In this case these may be components or actuating elements which are suitable and intended for carrying out settings, in particular settings on the machine, such as in particular but not exclusively cranks, handwheels, adjustment levers, slide controls, rotary knobs or other actuating elements. In addition, dimensions can also be output, for instance when measurements are to be determined on the machine.

In addition, it is also conceivable and preferred that textual instructions, as known hitherto from the internal conventional art of the applicant, are additionally displayed. Thus, overall by several different aids for setting values and/or parameters it is possible to avoid errors during operation of a plant and in particular also at start-up.

A WPF (Windows Presentation Foundation) element maybe used for generating an input element and/or a topic. In particular a WPF element is used which is also known by the designation "PictureBox". At least one image and in particular at least one image of the required module is inserted in this element.

In a preferred method the WPF element and in particular the element "PictureBox" is compressed and/or packed and in particular is compressed and/or packed into a container, preferably a higher-level WPF container. The WPF container may be a WPF container called grid.

An enlargement and/or zooming of the graphic element may be performed by the use and/or the application of a storyboard on the WPF container or grid. A storyboard is an image sequence which visualizes settings (for example of a film or image). Different animations may be created in the storyboard and in particular different animations with a specific duration are created. In order to produce a zoom, the above-mentioned grid is scaled in the x-direction and in the y-direction and in particular is scaled in the same time. This scaling can take place for example by means of the property ScaleTransform. The ScaleTransform object scales an element by a predetermined factor.

In particular in order to produce a positioning the grid is shifted in the x-direction and y-direction and may be shifted in the same time. This can take place for example by means of the property TranslateTransform.

Furthermore, the storyboard may be linked to the input element or to the user input. This can take place for example by means of the object "DataTrigger". DataTrigger may constitute a trigger which applies property values or carries out actions when the associated data meet a specified condition.

A predetermined property and in particular "IsTouchpadOwner" may be used as EnterAction in the DataTrigger. The effect of this property is that when a keyboard is opened the storyboard is executed. The relevant graph is zoomed in and/or it is positioned. Upon closing, the graphic should be moved again into a different position, in particular to a starting position. In order to achieve this the object or the command ExitAction can be used and/or the storyboard is reversed.

The input element "NumericVarIn" has several properties. One of these is called "IsTouchpadOwner". This property may be set when the keyboard (or generally an input means) of the input element is opened. When the input means is closed again the property is reset.

A display of individual aids, such as for instance dimensions, colourings and information, may take place. This display may be linked to the input element or to the user input or to a predetermined user input. Here too, once again the property "IsTouchpadOwner" of the input element may be associated with the visibility of the aids.

The graphical display allows the production of a local reference to the real machine. In addition, as mentioned above, by colouring, positioning and dimensioning a graphical representation of the instructions is possible. The instructions are better understood in particular due to the graphical assistance. A local reference can be produced for example in that in a view of the machine, plant part or also one or more plants away from the location of the graphical display to the setting location is illustrated. This may be a preferred path or also a prescribed path which takes safety aspects into consideration.

In a further preferred embodiment the machine has machine units which are selected from a group of machine units, which includes machines for transforming plastic preforms into plastic bottles, labelling devices, printing devices, filling devices for filling containers, inspection devices, machines for producing container groupings, shrink-fitting machines, film-wrapping machines and the like.

A container treatment machine is understood to be inter alia a stretch blow molding machine for producing or inflating PET bottles, a filling machine for filling containers, a (direct) printing machine for printing containers, a labelling machine for labelling containers, a coating machine for coating containers, a cleaning or sterilization machine for cleaning or sterilisation of containers, inspection machines for inspecting containers, a packaging machine for packaging containers, in particular in outer packagings (film, cardboard), a transporter for transporting containers (for example diverters, dividers, transport starwheels, buffers), palettising machines for palletising containers, depalletizing machines for depalletizing containers, closing machines for closing of containers, product treatment machines for treating beverages such as beer, cola, juice, water (degasifiers, flash heating plants, pasteurisers, filter systems for filtration, homogenisers, mixers, wort boilers, etc.) and the like.

Accordingly, a treatment may be understood to be production, inflation, printing, coating, cleaning, sterilisation, etc. Preferably it is a packaging machine.

In a further preferred method, the information output device outputs the information in at least two image output elements separated from one another. In this case it may be possible that both image output elements are output by means of the same image output device, for instance a touchscreen. Thus, one of the two image output elements may be the above-mentioned graphic, in particular a graphic which represents the machine or a machine region and in particular represents it with exact details. It is also possible that the information output device is mobile.

The other one of the two image output elements may be for instance a keyboard by means of which the user can input values, for example numerical values for the respective parameters. The information input by the user and in particular the information input by means of the image output device is linked with the further graphic element and in particular with the graphical representation of machine parts so that, as mentioned above, in response to an input by a user a specific machine part can be displayed or represented.

In a preferred embodiment a storage device is provided, in which a plurality of image elements are stored, in particular image elements which show graphics of the machine and/or of components of the machine. In a preferred embodiment an assigning device is also provided, which assigns a specific graphic to a specific user input and/or outputs a specific graphic in response to a specific user output.

As mentioned above, the information output device outputs the information in particular in at least two windows or elements. These are separated or separable from one another and particularly are also movable independently of one another.

In a further preferred embodiment, the information output device at least temporarily outputs a pictorial representation of at least one part of the machine. Thus, the entire machine can be imaged, but also parts of the machine, as mentioned above. These images may be displayed in a high degree of detail, so that the corresponding machine parts can be quickly identified by a user.

In a further advantageous embodiment, the information output device at least temporarily outputs, as a function of an input parameter, a representation of a region of the machine to which this parameter relates. Thus, for example the machine region can also be displayed for example on an enlarged scale, for which the related parameter is relevant, for example a spatial detail which is implemented on a specific machine part. As stated, an enlarged graphic of a specific machine region or operating region, one or more plant units or even complete plants are also imaged.

In a further advantageous embodiment, the information output device at least temporarily outputs an actuatable keyboard or character field which allows the input of numbers and/or letters. Thus, for example a keyboard can be imaged on a display such as a touchscreen and the user can input parameters by means of the keyboard. In addition, input points can also be provided, so that the user can first of all select which parameter he wishes to input or for example also to change. However, an additional keyboard could also be present for input of data.

In a further advantageous method, the information input device constitutes at least one and may be a plurality of input elements which can be selected by a user. Thus, for example in the context of a table or the like specific lines could be selected, wherein the user can then input the values he requires into these tables. In a further preferred method, the information input device also outputs processing information to the user in text form. The information output device may select at least one graphic element as a function of a selected input element.

In a further preferred method at least one image element is output at least temporarily in conjunction with values which are selected from a group of values which includes numbers, letters, colours or the like. In this way for example specific image elements or sections thereof can be particularly characterised or are highlighted for a user in a particular manner.

In a further preferred embodiment, the apparatus has an image manipulation unit which, on the basis of display data stored in the above-mentioned storage device, provides image sequences which can be output by means of the information output device. In this way it is possible not only to output still images of machine parts, but also moving images, in order thus to be able to give the user better instructions. In a preferred embodiment these display data are stored in the form of vector graphics or process data in the storage device. In this way data volumes can be reduced.

In a further preferred method images of the respective components and/or machine parts are stored in a simplified form in the storage device. In this way it is possible that a large number of images and/or image sequences are stored in the apparatus. In this case in a preferred method it is also possible, that no static images are output by means of the information output device or not only static images, but also moving images or video sequences.

In the further preferred method image sequences are generated from display data stored in the storage device.

In a further preferred method at least one operational state of the machine and/or a value characteristic for such an operational state is detected. Thus, for example one or more sensor devices can be provided which are suitable and intended to collect specific operating data. The user can also input and/or change his parameters in response to or taking account of these operating parameters.

The value is selected from a group of values which includes temperature values, position values, location values, pressure values, force values, torque values, acceleration values, speed values and the like.

Furthermore, embodiments of the present invention relate to a treatment machine for containers and/or beverages, which comprises at least one treatment unit which treats containers in a predetermined manner. In this case at least one parameter of this treatment can be predetermined and an input device is provided which enables the input of at least one parameter as well as a control device, which controls the machine at least temporarily on the basis of this parameter and also an information output device which is suitable and intended, at least temporarily, to output to a user information which is characteristic for a status of the machine and/or for data input by the user.

According to embodiments of the invention the information output device is suitable and intended, at least temporarily, to output information in image form or as image elements and/or video sequences.

In a further preferred method, first of all a task can be opened by the user, wherein first of all an entire graphic or the entire machine is visible. As soon as the user actuates a specific input element or initiates the change or input of a specific parameter, an image element, in particular in the form of a keyboard, opens. Furthermore, as a function of the selected input element a positioning or zooming of the graphic element to a pre-defined position can take place. Furthermore, as a function of the selected input element a graphic can be displayed and for example highlighting, such as colouring, dimensioning, a scale or a text description can also take place. Now the user can input a value by means of the displayed keyboard. After the user closes the keyboard, likewise again by means of the information output device, the graphic can also be hidden again and for example also the colouring, the dimensioning or the scale disappear.

However, the above-mentioned video sequences can also be moving recordings of machine parts. However, these may be simulated video sequences.

In this case it may be also possible that these video sequences have a multimedia configuration in such a way that in particular individual operating tasks on the machine are also shown for example including texts, graphics, speech and/or sound.

Furthermore, it would also be possible that in each case only portions of a complete operating process are displayed by a video sequence. In addition, it would also be possible that by means of the information output device consequences or effects of input parameters are presented, for example displayed, showing how a specific change affects a machine operation.

In a further preferred method, a specific image element and/or a video sequence element to be played back is selected by means of a current working or operational state of the machine and/or by means of the next operational action expected by a user. In this way it is also possible that the information output device displays a succession of images which for example show operating steps or instruct the user to change different parameters. Thus, it is possible for example that in response to the change of a blowing pressure further changes should also be carried out, such as for example a temperature of a preform heating oven. In this case the image sequences can also proceed and give the user in each case the required instructions.

BRIEF DESCRIPTION

Some of the embodiments will be described in detail, with reference to the following figures, wherein like designations denote like members, wherein.

DETAILED DESCRIPTION

Figure 1:
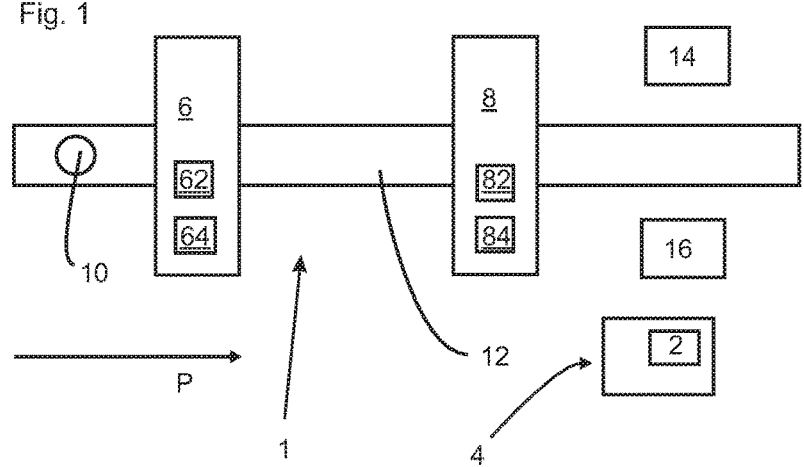
FIG. 1 shows a rough schematic representation of a treatment plant for containers and/or beverages.

FIG. 1 shows a rough schematic representation of a treatment machine 1 for treating containers 10 here. In this case the containers 10 are transported by means of a transport device 12 along a predetermined transport path. In this case, however, this transport device can also have different transport units. The transport device advantageously has transport units which are selected from a group of transport units which includes transport starwheels, transport belts, air conveyors, roller sorters and the like. Along the transport path P the machine 1 has a first treatment device 6 and a second treatment device 8. In this case these two treatment devices can have treatment elements 62 and 64 or 82 and 84 which are controlled, for example their movement can be controlled. Thus, these treatment elements can have drives which carry out specific movements.

The reference 14 designates a control device which serves for controlling the treatment device 6 and 8 or also the treatment elements 62, 64, 82, 84. The reference 4 designates an information output device. In this case this device may for example be a display or for instance also a touchscreen or the like. This device may be an information output device which is also simultaneously suitable and intended for the input of information, such as for instance the touchscreen already mentioned above. The reference 2 designates an input device, by means of which the user can input information which can serve for example for controlling the machine 1. In this case this input device 2 can also be displayed as a graphic element on the information output device, for example as a keyboard, by means of which the user performs inputs using the fingers or a pen.

Figure 2:
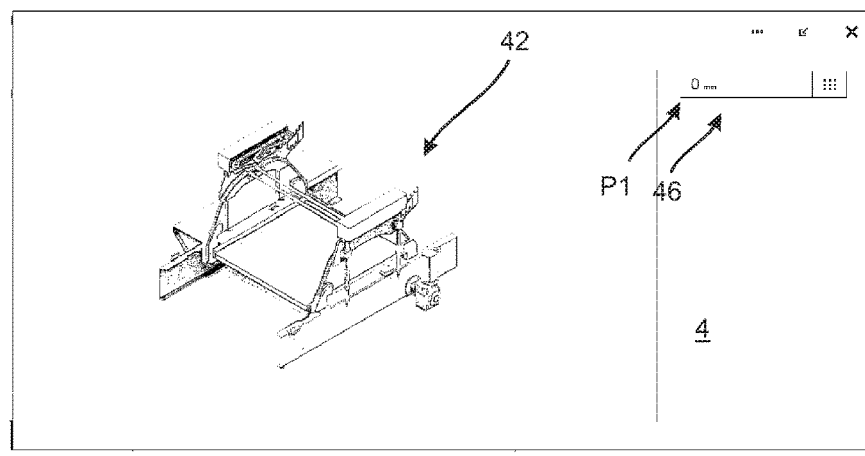
FIG. 2 shows a representation of an information output device.

FIG. 2 shows a representation of an information output device 4. In this case this information output device 4 outputs a first graphic element 42. This graphic element may be the machine or in this case a machine part on which for example parameters are to be altered. In this case the user (not shown in greater detail) can open a topic or a content. The reference 46 designates an input element, into which the user can input parameters, for example a parameter P1. In this case this parameter can be characteristic for example for a specific treatment element and can serve for control thereof.

Figure 3:
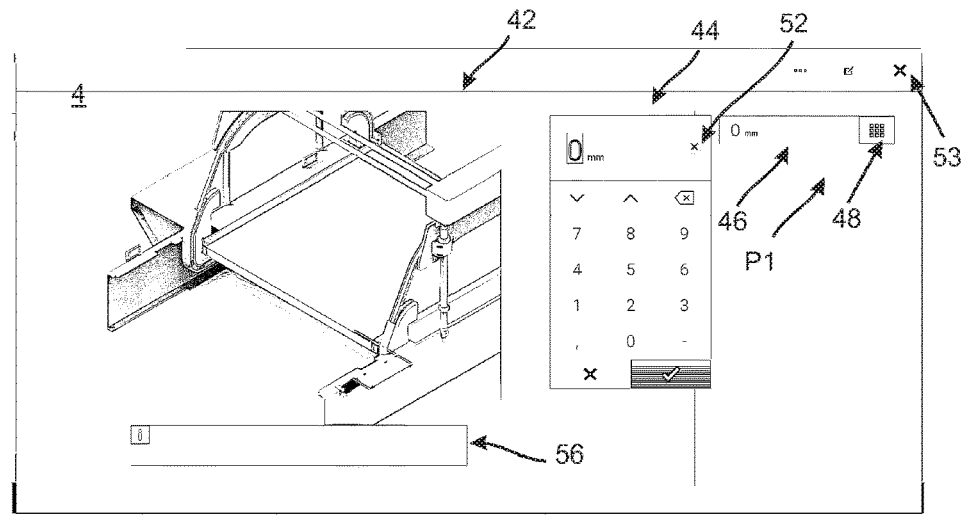
FIG. 3 shows a further representation of an information output device according to embodiments of the invention.

FIG. 3 shows a further representation of an information output device according to embodiments of the invention. Here, in addition to the first graphic element 42 a second graphic element 44 is also output, in this case in the form of a keyboard. The user can input for example numerical values into the input element 46 by means of this keyboard 44. A processor device 16 (cf. FIG. 1) assigns a specific region of the machine to this parameter or the input. Accordingly, the graphic element is enlarged, in particular on the region on which the setting applies or for which this setting is characteristic.

The reference 56 designates quite schematically an output element, by means of which for example text information can be output to the user. By means of a further input element 48 the user can enable access to the keyboard. The reference 52 designates a closing element by which for example a keyboard can be closed again. The reference 53 designates a further closing element for closing an input operation.

In this case in the region of the graphic element 42 specific regions of the plant part can also be highlighted, for example by colouring, so that the user can recognise precisely where on the machine settings are carried out.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 treatment machine
2 input device
4 information output device
6 first treatment device
8 second treatment device
12 transport device
14 control device
16 processor device
42 first graphic element
44 second graphic element
46 input element
48 input element
52 closing element
53 closing element
56 output element
62 treatment element
64 treatment element
82 treatment element
84 treatment element
T transport path
P1 parameter

The invention claimed is:

1. A method for controlling a container treatment machine, wherein the container treatment machine treats containers using predeterminable parameters, wherein at least one control device controls the treatment machine taking into account the predeterminable parameters, the method comprising:
   inputting the predeterminable parameters by an input device, and
   outputting, by an information output device, information to a user, the information being characteristic of at least one of a status of the container treatment machine and of data input by the user, wherein the information is output at least partially in image form, wherein the information output device outputs an enlarged image of the container treatment machine or of a machine part, wherein a graphic or a display thereof can be positioned on a region in which a value to be set is to be determined and/or for which the value to be set takes effect,
   wherein the information is selected from a group of information which includes status information about the status of the container treatment machine, work instructions, information about working steps to be carried out, actual states of the container treatment machine and target states of the container treatment machine.

2. The method according to claim 1, wherein the information is at least one of selected and displayed taking into consideration the inputs made by the user.

3. The method according to claim 2, wherein the information output device can indicate a region of the container treatment machine in which the predetermined parameter is relevant.

4. The method according to claim 1, wherein the machine has machine units which are selected from a group of machine units, which includes machines for transforming plastic preforms into plastic bottles, labelling devices, printing devices, filling devices for filling containers, inspection devices, machines for producing container groupings, shrink-fitting machines, and/or film-wrapping machines.

5. The method according to claim 1, wherein the information output device outputs the information in at least two image output elements which are separate from one another.

6. The method according to claim 1, wherein the information output device at least temporarily outputs a pictorial representation of at least one part of the container treatment machine.

7. The method according to claim 1, wherein, as a function of an input parameter, the information output device at least temporarily outputs a representation of at least one region of the machine to which the parameter relates.

8. The method according to claim 1, wherein the information output device at least temporarily outputs an actuatable keyboard which allows the input of at least one of numbers and letters.

9. The method according to claim 1, wherein the information input device constitutes at least one or a plurality of input elements which can be selected by the user.

10. The method according to claim 1, wherein the image element is output at least temporarily in conjunction with at least one of values and information which are selected from a group of values which includes numbers, letters, and colors.

11. The method according to claim 1, wherein an assigning device is also provided, which assigns a specific graphic to a specific user input and/or outputs a specific graphic in response to a specific user output.

12. The method according to claim 1, wherein the information output device outputs the information in at least two windows or elements, wherein these are separated or separable from one another and are also movable independently of one another.

13. The method according to claim 1, wherein at least one operational state of the container treatment machine and/or a value characteristic for such an operational state is detected, wherein one or more sensor devices are provided which are configured to collect specific operating data, and wherein the user can input and/or change the parameters in response to or taking into account the operating parameters.

14. A treatment machine for containers, comprising:
   at least one treatment unit which treats the containers in a predetermined manner, wherein at least one parameter of this treatment can be predetermined,
   an input device which enables the input of at least one parameter,
   a control device which controls the treatment machine on the basis of the parameter, and
   an information output device which is configured to output to a user information which is characteristic for a status of the treatment machine and/or for data input by the user, wherein the information output device is also configured to output information in image form, wherein the information output device outputs an enlarged image of the treatment machine or of a machine part, wherein a graphic or display thereof can be positioned on a region in which a value to be set is to be determined and/or for which the value to be set takes effect,
   wherein the information is selected from a group of information which includes status information about the status of the treatment machine, work instructions, information about working steps to be carried out, actual states of the container treatment machine and target states of the treatment machine.

15. The treatment machine according to claim 14, wherein the information output device can indicate a region of the treatment machine in which the predetermined parameter is relevant.

16. The treatment machine according to claim 14, wherein an assigning device is also provided, which assigns a specific graphic to a specific user input and/or outputs a specific graphic in response to a specific user output.

17. The treatment machine according to claim 14, wherein the information output device outputs the information in at least two windows or elements, wherein these are separated or separable from one another and are also movable independently of one another.

18. The treatment machine according to claim 14, wherein at least one operational state of the treatment machine and/or a value characteristic for such an operational state is detected, wherein one or more sensor devices are provided which are configured to collect specific operating data, and wherein the user can input and/or change the parameters in response to or taking into account the operating parameters.

* * * * *